United States Patent
Bahng et al.

(10) Patent No.: US 8,036,322 B2
(45) Date of Patent: Oct. 11, 2011

(54) METHOD OF CALCULATING LOG-LIKELIHOOD RATIO AND METHOD OF DETECTING TRANSMISSION SIGNAL

(75) Inventors: Seung Jae Bahng, Daejeon (KR); Jae Kwon Kim, Wonju-si (KR); Hoon Heo, Seoul (KR); Hyun Myung Wu, Suwon-si (KR); Youn-Ok Park, Daejeon (KR); Dae Ho Kim, Daejeon (KR); Kyung Yeol Sohn, Daejeon (KR); Chang Wahn Yu, Daejeon (KR); Jun-Woo Kim, Daejeon (KR); Eon Young Hong, Daejeon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 664 days.

(21) Appl. No.: 12/141,382

(22) Filed: Jun. 18, 2008

(65) Prior Publication Data
US 2009/0135964 A1 May 28, 2009

(30) Foreign Application Priority Data
Nov. 22, 2007 (KR) .......... 10-2007-0119826

(51) Int. Cl.
*H04L 27/06* (2006.01)
(52) U.S. Cl. ........ 375/341; 375/262; 375/340; 714/794; 714/795
(58) Field of Classification Search .......... 375/341
See application file for complete search history.

(56) References Cited

U.S. PATENT DOCUMENTS

| | | | |
|---|---|---|---|
| 4,291,406 A * | 9/1981 | Bahl et al. | 714/787 |
| 6,553,536 B1 * | 4/2003 | Hassner et al. | 714/780 |
| 2004/0141566 A1 * | 7/2004 | Kim et al. | 375/267 |
| 2006/0222121 A1 * | 10/2006 | Uchikawa et al. | 375/347 |
| 2007/0086541 A1 | 4/2007 | Moon et al. | |
| 2010/0086067 A1 * | 4/2010 | Oka | 375/260 |

FOREIGN PATENT DOCUMENTS

| | | |
|---|---|---|
| KR | 10-2007-0046331 A | 3/2007 |
| KR | 10-2007-0052037 A | 5/2007 |
| WO | 02/052734 A1 | 7/2002 |

OTHER PUBLICATIONS

Kawai et al., Likelihood Function for QRM-MLD Suitable for Soft-Decision Turbo Decoding and Its Performance for OFCDM MIMO Multiplexing in Multipath Fading Channel, Special Section on Multi-carrier Signal Processing Techniques for Next Generation Mobile Communications, Jan. 2005, pp. 47-57, IEICE Trans. Commun., vol. E88, No. 1.

* cited by examiner

*Primary Examiner* — Dac Ha
*Assistant Examiner* — Erin File
(74) *Attorney, Agent, or Firm* — Jefferson IP Law, LLP

(57) ABSTRACT

The present invention relates to a method of calculating a log-likelihood ratio and a method of detecting a transmission signal. According to the present invention, when a transmission symbol candidate vector is detected on the basis of a received signal, a threshold value and an ML metric of each transmission symbol candidate vector are calculated and the ML metric that is larger than the threshold value is updated by the threshold value. Further, a log-likelihood ratio of the transmission signal bit is calculated using the updated ML metric and the threshold value, and a transmission signal is detected using the log-likelihood ratio.

12 Claims, 4 Drawing Sheets

METHOD OF CALCULATING LOG-LIKELIHOOD RATIO AND METHOD OF DETECTING TRANSMISSION SIGNAL

CROSS-REFERENCE TO RELATED APPLICATION

This application claims priority to and the benefit of Korean Patent Application No. 10-2007-0119826 filed in the Korean Intellectual Property Office on Nov. 22, 2007, the entire contents of which are incorporated herein by reference.

BACKGROUND OF THE INVENTION (a) Field of the Invention

The present invention relates to a method of calculating a log-likelihood ratio and a method of detecting a transmission signal. More particularly, the present invention relates to a method of calculating a log-likelihood ratio and a method of detecting a transmission signal in a multiple input multiple output (MIMO) system using a spatial multiplexing (SM) method.

(b) Description of the Related Art

Future mobile communication systems demand high-speed data transmission under stationary and mobile environments. In order to meet these demands, a multiple input multiple output (MIMO) system using a spatial multiplexing (SM) method that is capable of transmitting a multiple data layer is attracting attention.

In the MIMO system using the spatial multiplexing method, a data layer indicating different information is transmitted through a transmitting antenna, and a receiving terminal separates the transmitted data layers. In the data layer separation method according to the related art, maximum likelihood (ML) bit metric detection has been used in which a maximum likelihood metric is calculated for each of transmission symbol vectors that can be combined and a transmission symbol vector having the smallest ML metric is searched, in order to perform optimal transmission symbol detection.

However, even though the ML bit metric detection provides optimal transmission symbol detection performance, since hardware complexity is exponentially increased with respect to the size of a constellation and the number of transmitting antennas, the ML bit metric detection has a drawback in that extremely high complexity is required.

Meanwhile, methods such as maximum likelihood detection with QR decomposition and M-algorithm (QRM-MLD) and likelihood ratio logarithm with QR decomposition and M-algorithm (QR-LRL), which are new detecting methods, have been proposed to solve this problem. If these methods are used, the hardware complexity is decreased. However, there is a problem in that the calculation of the log-likelihood ratio becomes inaccurate because the number of candidate vectors used in calculating the log-likelihood ratio is small.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method of detecting a transmission signal and a receiver having advantages of low complexity and an improved transmission-signal detection performance in a MIMO system using a spatial multiplexing method, and a method of calculating a log-likelihood ratio therefor.

An exemplary embodiment of the present invention provides a method of calculating a log-likelihood ratio of a receiver. The method includes detecting a transmission symbol candidate vector group, calculating a threshold value by using the transmission symbol candidate vector group, calculating a maximum likelihood metric of each of transmission symbol candidate vectors included in the transmission symbol candidate vector group, updating the maximum likelihood metric of each of the transmission symbol candidate vectors by substituting a maximum likelihood metric that is larger than the threshold value among the maximum likelihood metrics with the threshold value, and calculating a log-likelihood ratio of a transmission signal by using the maximum likelihood metric of each of the transmission symbol candidate vectors and the threshold value.

Further, another exemplary embodiment of the present invention provides a method of detecting a transmission signal of a receiver. The method includes estimating a channel matrix, rearranging a plurality of layers on the basis of the norms of columns of an inverse matrix of the channel matrix, detecting a transmission symbol candidate vector group by using the plurality of rearranged layers, calculating a log-likelihood ratio of a transmission signal by using the maximum likelihood metric and a threshold value of each transmission symbol candidate vector included in the transmission symbol candidate vector group, and detecting the transmission signal on the basis of the log-likelihood ratio.

According to the present invention, a receiver can detects a transmission signal by using a method of calculating a log-likelihood ratio that has low complexity and high performance in a MIMO system using a spatial multiplexing method.

DETAILED DESCRIPTION OF THE EMBODIMENTS

Figure 1:
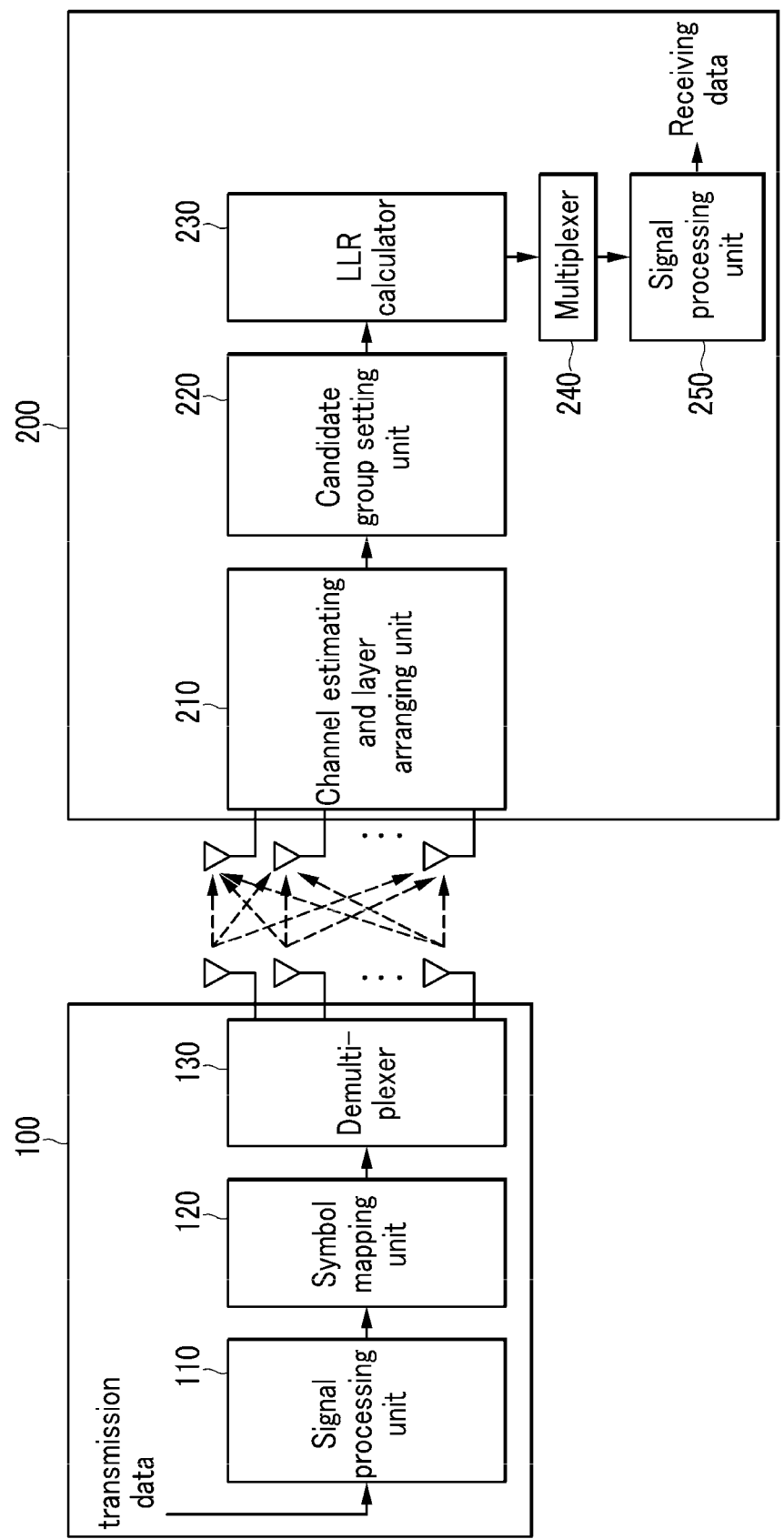
FIG. 1 is a diagram showing the configuration of a receiver according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, the terms "-er", "-or", and "module" described in the specification mean units for processing at least one function and operation, and can be implemented by hardware components or software components, and combinations thereof.

Hereinafter, a method of calculating a log-likelihood ratio, a method of detecting a transmission signal, and a receiver in a multiple input multiple output (MIMO) system using a spatial multiplexing (SM) method, according to exemplary embodiments of the present invention, will be described in detail with reference to the drawings.

A QR-LRL (likelihood ratio logarithm with QR decomposition and M-algorithm) method is exemplified as a method of detecting a transmission signal in the exemplary embodiment of the present invention, but the present invention may be applied to other methods of detecting a transmission signal.

FIG. 1 is a diagram showing the configuration of a transmitter 100 and a receiver 200 according to an exemplary embodiment of the present invention.

The transmitter 100 and the receiver 200 according to the exemplary embodiment of the present invention may include a different number of transmitting/receiving antennas. However, the configuration of a transceiver will be described below using a MIMO system where a transmitter 100 includes four transmitting antennas and a receiver 200 includes four receiving antennas, for better comprehension and ease of description.

Referring to FIG. 1, the transmitter 100 includes a signal processing unit 110, a symbol mapping unit 120, and a demultiplexer 130.

The signal processing unit 110 performs signal processing, such as scrambling, error correction coding, and interleaving on transmission data, and outputs the transmission data. In this case, the transmission data tat is input to the signal processing unit 110 means binary data that is transferred from a medium access control (MAC) layer to a physical layer.

The symbol mapping unit 120 converts the transmission data that is signal-processed and output by the signal processing unit 110, into high-speed symbols on the basis of a modulation method, and outputs the high-speed symbols.

The demultiplexer 130 divides the high-speed symbols that are output from the symbol mapping unit 120 into four low-speed layers on the basis of the number of the transmitting antennas, and outputs the four low-speed layers. The low-speed layers that are output are simultaneously transmitted through each of the transmitting antennas, respectively. In this case, each layer means a data stream.

The receiver 200 includes a channel estimating and layer arranging unit 210, a candidate group setting unit 220, an LLR calculator 230, a 240, and a signal processing unit 250.

The channel estimating and layer arranging unit 210 performs channel estimation using signals received through the receiving antennas and rearranges the layers and the channels, and then outputs them. According to the layer rearrangement method, a layer having the lowest reliability is arranged as the last layer, and the remaining layers are sequentially arranged from the layer having lower reliability to the layer having higher reliability from the first layer. That is, the layer having the lowest reliability is arranged as the last layer, the layer having the highest reliability is arranged as the third layer, and the next layers are arranged as the second layer and the first layer, respectively. This arranging method is on the assumption that the QR-LRL is used as a receiving method. If other receiving methods are used, other arranging methods may be used. In the exemplary embodiment of the present invention, the reliability of a layer is determined on the basis of a signal-to-noise ratio (SNR).

The candidate group setting unit 220 determines a transmission symbol candidate vector by using the rearranged layers and channels that are received from the channel estimating and layer arranging unit 210.

The LLR calculator 230 calculates a soft value of each bit of a plurality of layers by using the transmission symbol candidate vector that is determined by the candidate group setting unit 220. In this case, a log-likelihood ratio is used as the soft value.

The multiplexer 240 and the signal processing unit 250 perform reverse functions of the demultiplexer 130 and the signal processing unit 110 of the transmitter 100, respectively, perform channel decoding by using the soft value that is calculated by the LLR calculator 230, and then detect a transmission signal.

Next, referring to FIGS. 2 and 3, a method of calculating a log-likelihood ratio of the receiver 200 according to the exemplary embodiment of the present invention, and a method of detecting a transmission signal using this, will be described in detail.

Figure 2:
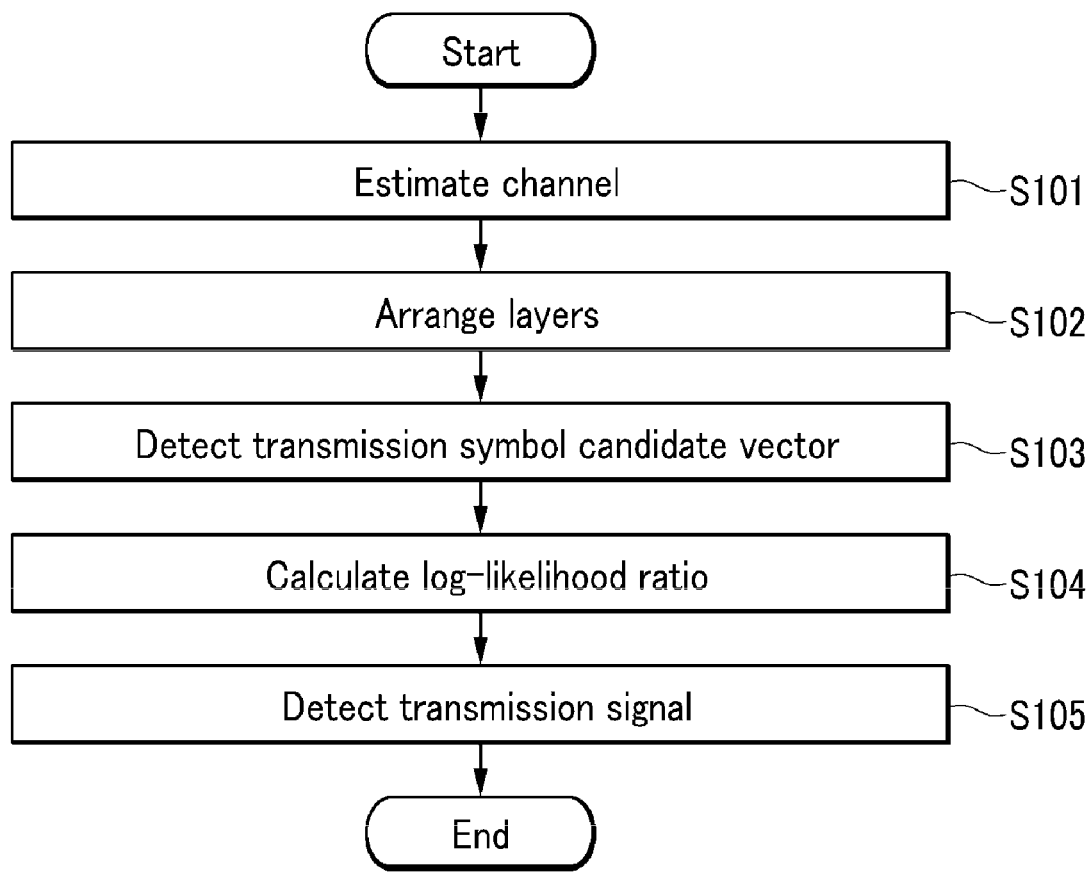
FIG. 2 is a flowchart illustrating a method of detecting a transmission signal according to an exemplary embodiment of the present invention.

FIG. 2 is a flowchart illustrating a method of detecting a transmission signal of the receiver 200 according to the exemplary embodiment of the present invention.

Referring to FIG. 2, when a signal is received through the antenna of the receiver 200, the channel estimating and layer arranging unit 210 estimates a channel matrix ($\tilde{H}$) by using the received signal (S101), and calculates an inverse matrix (G) of the channel matrix ($\tilde{H}$), which is estimated as Equation 1, in order to arrange the layers.

$$G=\tilde{H}^{-1} \quad \text{(Equation 1)}$$

When the inverse matrix (G) of the estimated channel matrix ($\tilde{H}$) is calculated, the channel estimating and layer arranging unit 210 calculates the norm of each column of the inverse matrix (G) and rearranges the layers on the basis of the norm of each column. Further, the channel matrix is rearranged according to the order of rearranged layers (S102). Specifically, a layer ($x_4$), which corresponds to the column having the largest norm among the columns of the matrix (G), is positioned last, and other layers ($x_2$, $x_1$) are arranged from the first in an order corresponding to the column having the smallest norm. Furthermore, a row of the estimated channel matrix ($\tilde{H}$), which corresponds to the column having the largest norm among the columns of the inverse matrix (G), is allocated to the last row ($h_4$) of a rearranged channel matrix (H). A row of the estimated channel matrix ($\tilde{H}$), which corresponds to the column having the smallest norm, is allocated to the third row ($h_3$) of the rearranged channel matrix (H). Then, rows of the estimated channel matrix ($\tilde{H}$) are allocated at the rearranged channel matrix (H) in an order corresponding to the norms of the columns of the inverse matrix (G). A system model after rearranging is represented by the following Equation 2.

$$\tilde{y}=Hx+\tilde{n} \quad \text{(Equation 2)}$$

Here, $\tilde{y}=[\tilde{y}_1\ \tilde{y}_2\ \tilde{y}_3\ \tilde{y}_4]^T$ refers to a received signal, $x=[x_1\ x_2\ x_3\ x_4]^T$ refers to a rearranged transmission signal (layer), $\tilde{n}=[\tilde{n}_1\ \tilde{n}_2\ \tilde{n}_3\ \tilde{n}_4]^T$ refers to a noise signal, and $H=[h_1\ h_2\ h_3\ h_4]^T$ indicates a rearranged channel matrix. Further, since $x_4$ has the smallest SNR, $x_4$ refers to a layer having the lowest reliability. Since $x_3$ has the highest SNR, $x_3$ refers to a layer having the highest reliability. $x_2$ refers to a layer having the second highest SNR, and $x_1$ indicates a layer having the third highest SNR. The reason why the channel estimating and layer arranging unit 210 rearranges the layers is to consider all constellation dots for the layer ($x_4$) having the lowest reliability when the candidate group setting unit 220 detects the transmission symbol candidate vector.

As described above, the channel matrix (H) and the layer ($x=[x_1\ x_2\ x_3\ x_4]^T$), which are rearranged by the channel estimating and layer arranging unit 210, are input to the candidate group setting unit 220. Thereafter, the candidate group setting unit 220 QR decompose the rearranged channel matrix (H), applies a Hermitian matrix ($Q^H$) of an orthogonal matrix (Q), which is obtained by the QR decomposition, to the received signal ($\tilde{y}=[\tilde{y}_1\ \tilde{y}_2\ \tilde{y}_3\ \tilde{y}_4]^T$), and removes the successive interference to detect a transmission symbol candidate vector (S103). The following Equation 3 represents a set (B) of the transmission symbol candidate vectors ($\hat{x}(l)$) that are obtained as many as the number of the constellation dots by using this method.

$$B=\{\hat{x}(l)\},\ 1\leq l\leq C \quad \text{(Equation 3)}$$

where l is an integer in the range of 1 to C.

Meanwhile, in the exemplary embodiment of the present invention, each of the bits of the transmission signals, that is, the soft value of each of the bits of the plurality of layers, are used to obtain a larger coding gain during the channel decoding. That is, soft decision is performed using the soft value corresponding to each of the bits of the plurality of layers to detect the transmission signal. In this case, the soft value is a log-likelihood ratio.

Accordingly, the LLR calculator 230 calculates a log-likelihood ratio, which corresponds to each of the bits of the transmission symbol, for the purpose of the channel decoding (S104). Further, the multiplexer 240 and the signal processing unit 250 perform the channel decoding by using the log-likelihood ratio calculated by the LLR calculator 230, and detect the transmission signal (S105).

Figure 3:
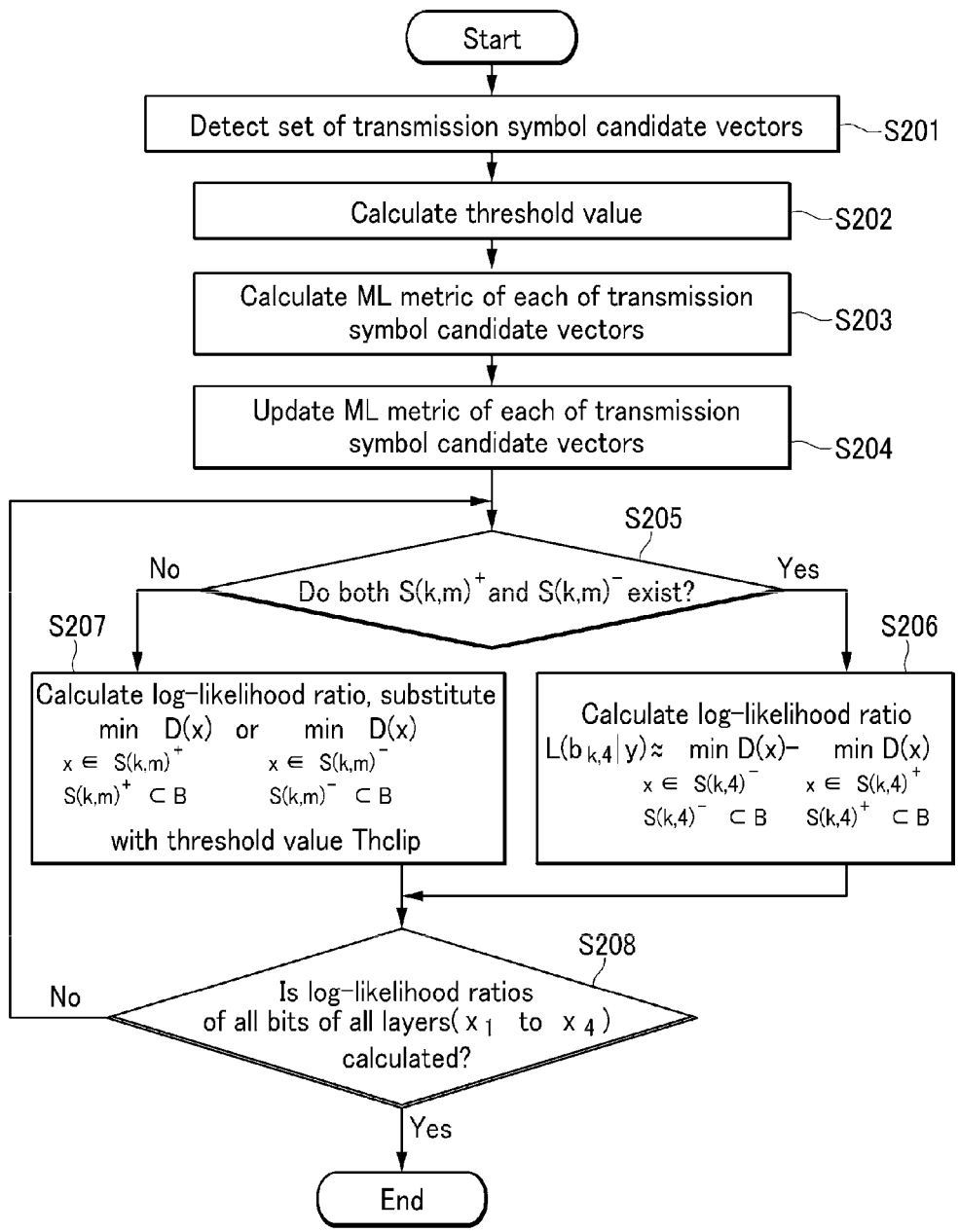
FIG. 3 is a flowchart illustrating a method of calculating a log-likelihood ratio according to an exemplary embodiment of the present invention.

FIG. 3 is a flowchart illustrating a method of calculating a log-likelihood ratio according to an exemplary embodiment of the present invention. Meanwhile, in the exemplary embodiment of the present invention, 16-QAM (quadrature amplitude modulation) is exemplified as a modulation method. However, the present invention is not limited thereto and may be applied to other modulation methods.

First, the following Equation 4 represents a log-likelihood ratio function that calculates a log-likelihood ratio of $b_{k,m}$ defined as a k-th bit of an m-th transmission symbol.

$$L(b_{k,m}\mid y)=\min_{x\in S(k,m)^-} D(x) - \min_{x\in S(k,m)^+} D(x) \quad \text{(Equation 4)}$$

where D(x) refers to Euclidean distance of a transmission symbol candidate vector of each bit ($b_{k,m}$) of the transmission signal, and is defined as $D(x)\equiv\|y-Rx\|$ in the exemplary embodiment of the present invention. Further, $S(k,m)^+$ refers to a symbol vector set corresponding to 1 ($b_{k,m}=1$) among the transmission symbol candidate vectors corresponding to each bit ($b_{k,m}$) of the transmission signal, and $S(k,m)^-$ refers to a symbol vector set corresponding to 0 ($b_{k,m}=0$) among transmission symbol candidate vectors corresponding to each bit ($b_{k,m}$) of the transmission signal.

Meanwhile, the log-likelihood ratio function of the above-mentioned Equation 4 can calculate a log-likelihood ratio of bits of the transmission signal, which simultaneously exist in $S(k,m)^+$ and $S(k,m)^-$, like the following Equation 5 and Equation 6. Equation 5 represents a log-likelihood ratio function when an ML (maximum likelihood) solution is included in the set (B) of the transmission symbol candidate vectors, and Equation 6 represents a log-likelihood ratio function when an ML solution is not included in the set (B) of the transmission symbol candidate vectors.

$$L(b_{k,m}\mid y)\approx \min_{x\in S(k,m)^-} D(x) - \min_{x\in S(k,m)^+} D(x) \quad \text{(Equation 5)}$$
$$= D(x_{ML}) - \min_{x\in S(k,m)^+} D(x) < 0$$

In Equation 5, it was assumed that the ML solution $x_{ML}$ is the same as the transmission symbol candidate vector corresponding to the minimum ML metric among the transmission symbol candidate vectors included in the set (B) of the transmission symbol candidate vectors, and that the transmission symbol candidate vector is "0". Meanwhile, even when the transmission symbol candidate vector is "1", it is possible to calculate a log-likelihood ratio by the same method. Meanwhile, if a log-likelihood ratio is calculated using the above-mentioned Equation 5, the right term generates a positive error, so that the result value of a log-likelihood function becomes a negative number.

$$L(b_{k,m}\mid y)\approx \min_{x\in S(k,m)^-} D(x) - \min_{x\in S(k,m)^+} D(x) \quad \text{(Equation 6)}$$
$$= D(x_{ML,B}) - \min_{x\in S(k,m)^+} D(x) < 0$$

Meanwhile, in Equation 6, it has been assumed that the transmission symbol candidate vector corresponding to the minimum ML metric is "0". However, even if the symbol candidate vector corresponding to the minimum ML metric has other values, the present invention may be applied. Since both right terms of Equation 6 generate positive errors, the reliability of the log-likelihood function is significantly deteriorated.

Accordingly, in the exemplary embodiment of the present invention, the ML metric used in the log-likelihood function is compared with a specific threshold value, and an ML metric larger than the specific threshold value is substituted with a specific threshold value.

In this case, a method of calculating a threshold value $Th_{clip}$ to be used is represented by the following Equation 7.

$$Th_{clip} = \frac{1}{P\cdot N\cdot F\cdot L\cdot M\cdot K}\sum_p\sum_n\sum_f\sum_l\sum_m\sum_k T(k,m,l,f,n,p) \quad \text{(Equation 7)}$$

Here, k refers to a bit index, m refers to a symbol index, l refers to a layer index, and p refers to a packet index. Further, f refers to a sub-channel index applied when a mobile communication system uses an OFDM (orthogonal frequency division multiplexing) method, and n refers to an OFDM symbol index. Furthermore, a capital letter corresponding to each index refers to the number of symbols and layers corresponding to each index. In this case, if the mobile communication system does not use an OFDM method, f and n indexes are excluded from Equation 7.

Meanwhile, an operand T(k,m,l,f,n,p) of Equation 7 is calculated using the following Equations 8 and 9.

$$T^+(k, m, l, f, n, p) = \min_{\substack{x \in S(k,m,l,f,n,p)^+ \\ S(k,m,l,f,n,p)^+ \subset B}} D(x) \quad \text{(Equation 8)}$$

$$T^-(k, m, l, f, n, p) = \min_{\substack{x \in S(k,m,l,f,n,p)^- \\ S(k,m,l,f,n,p)^- \subset B}} D(x) \quad \text{(Equation 9)}$$

$$T(k, m, l, f, n, p) = \quad \text{(Equation 10)}$$
$$\max(T^+(k, m, l, f, n, p), T^-(k, m, l, f, n, p))$$

Equation 8 is an expression that calculates the minimum Euclidean Distance ($T^+(k,m,l,f,n,p)$) of the transmission symbol candidate vectors of "1" among the transmission symbol candidate vectors of each bit, and Equation 9 is an expression that calculates the minimum Euclidean distance ($T^-(k,m,l,f,n,p)$) of the transmission symbol candidate vectors of "0" among the transmission symbol candidate vectors of each bit. Further, Equation 10 is an expression that calculates the maximum value among the minimum Euclidean distances of the transmission symbol candidate vectors of "1" and "0" among the transmission symbol candidate vectors of each bit. Equation 7 is an expression that calculates an average of the maximum values calculated as described above.

A method of calculating a log-likelihood ratio using the threshold value calculated as described above will be described below.

Referring to FIG. 3, first, when the set (B) of the transmission symbol candidate vectors is detected (S201), the LLR calculator 230 calculates a threshold value $Th_{clip}$ by using the above-mentioned Equations 7 to 10 (S202). Further, an ML metric of each of the transmission symbol candidate vectors, which are included in the set (B) of the transmission symbol candidate vectors, is calculated (S203).

After that, the LLR calculator 230 compares the ML metric of each of the transmission symbol candidate vectors with the threshold value, and updates the ML metric to be larger than the threshold value by the threshold value (S204).

Further, the LLR calculator 230 confirms whether both $S(k,m)^+$ and $S(k,m)^-$ of each bit of the transmission signal exist or not (S205), and calculates a log-likelihood ratio by using the updated ML metric if the both $S(k,m)^+$ and $S(k,m)^-$ exist (S206). In this case, if the ML metrics of the transmission symbol candidate vectors corresponding to "0" and "1" of a transmission signal bit are updated by the threshold value, the log-likelihood ratio of the transmission bit becomes "0". Meanwhile, if $S(k,m)^+$ or $S(k,m)^-$ do not exist, a log-likelihood ratio is calculated using the threshold value instead of a value of $$\min_{\substack{x \in S(k,m)^+ \\ S(k,m)^+ \subset B}} D(x) \text{ or } \min_{\substack{x \in S(k,m)^- \\ S(k,m)^- \subset B}}$$

In this case, if the ML metric of the transmission symbol candidate vector corresponding to "0" or "1", which exists in the transmission signal bit, is updated by the threshold value, the log-likelihood ratio of the transmission bit becomes "0".

Meanwhile, the LLR calculator 230 repeats the steps (S203 to S207) of calculating the log-likelihood ratio until the log-likelihood ratios of all bits corresponding to all layers ($x_1$ to $x_4$) are calculated (S208).

Figure 4:
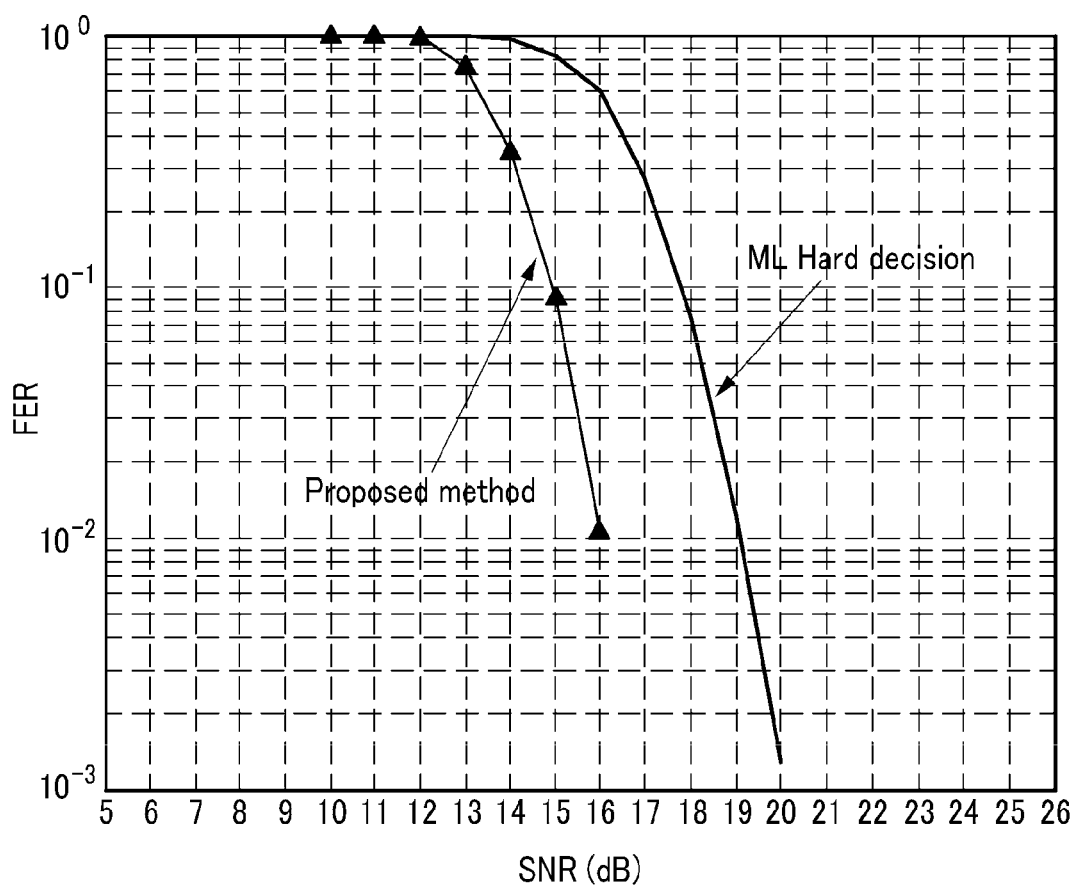
FIG. 4 is a graph showing an example of a block error rate when a transmission signal is detected using the receiver according to the exemplary embodiment of the present invention.

FIG. 4 is a graph showing an example of a block error rate when a transmission signal is detected using the receiver 200 according to the exemplary embodiment of the present invention.

Meanwhile, the environment of the simulation of FIG. 4 is shown in Table 1.

TABLE 1

| SIMULATION ENVIRONMENT | |
| --- | --- |
| System model | 4 × 4 MIMO-OFDM systems (spatial multiplexing) |
| Channel model | Exponential power delay profile |
| Channel estimation | Ideal CSI at Rx |
| Frame size | 10 OFDM symbols × 64-FFT size × 4 stream × 4 bits × ½ coding rate = 5,120 bits |
| FFT size | 64 points |
| modulation method | 16-QAM |
| error correction encoding | Convolutional Turbo Coding (CTC rate = ½) |
| Interleaving | Bit interleaving before symbol mapping (BICM) |

Referring to Table 1, the simulation was performed in a state where the 4×4 MIMO-OFDM system using a spatial multiplexing method was used as a system model. In this case, an exponential power delay profile was used as a channel model, and an ideal channel status information method (Ideal CSI at Rx) was used as a channel estimating method. Further, the frame size was 5120 bits, 16-QAM was used as a modulation method, convolution turbo coding was used as an error correction encoding, and bit interleaving before symbol mapping (BICM) was performed.

Referring to FIG. 4, when the comparison is performed on the basis of a frame error rate of $10^{-2}$, it can be seen that a method of detecting a signal (proposed method) according to the exemplary embodiment of the present invention has a gain of about 3 dB as compared to an ML signal detecting method (ML hard decision) for performing hard decision. That is, it can be seen that it is possible to more accurately detect a transmission signal.

The above-mentioned exemplary embodiments of the present invention are not embodied only by a method and apparatus. Alternatively, the above-mentioned exemplary embodiments may be embodied by a program performing functions, which correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of calculating a log-likelihood ratio of a receiver, the method comprising:
   detecting a transmission symbol candidate vector group;
   calculating a threshold value by using the transmission symbol candidate vector group;
   calculating a maximum likelihood metric of each of transmission symbol candidate vectors included in the transmission symbol candidate vector group;

updating the maximum likelihood metric of each of the transmission symbol candidate vectors by substituting the maximum likelihood metric, which is larger than the threshold value, among the maximum likelihood metrics with the threshold value; and calculating a log-likelihood ratio of a transmission signal by using the maximum likelihood metric of each of the transmission symbol candidate vectors and the threshold value.

2. The method of claim 1, wherein the calculating of the threshold value comprises:

calculating a first minimum Euclidean distance of candidates, which is a first value among the transmission symbol candidate vectors corresponding to bits of the transmission signal;

calculating a second minimum Euclidean distance of candidates, which is a second value that is different the first value among the transmission symbol candidate vectors corresponding to the bits;

calculating the maximum value of the first minimum Euclidean distance and the second Euclidean of the bits; and setting an average of the maximum values, which correspond to the bits, to the threshold value.

3. The method of claim 2, wherein the bits of the transmission signal are divided by a bit index, a symbol index, a layer index, and a packet index.

4. The method of claim 2, wherein when an orthogonal frequency division multiplexing method is used, the bits of the transmission signal are divided by a bit index, a symbol index, a layer index, a packet index, a subchannel index, and an orthogonal frequency division multiplexing symbol index.

5. The method of claim 2, wherein the calculating of the log-likelihood ratio further comprises:

detecting a bit, which has the only first value as a candidate, among the bits; and calculating a log-likelihood ratio of the bit detected using the maximum likelihood metric and the threshold value of the candidate that is the first value of the detected bit.

6. The method of claim 2, wherein the calculating of the log-likelihood ratio further comprises:

detecting a bit, which has the only second value as a candidate, among the bits; and calculating a log-likelihood ratio of the bit detected using the maximum likelihood metric and the threshold value of the candidate that is the second value of the detected bit.

7. The method of claim 2, wherein the calculating of the log-likelihood ratio further comprises:

detecting a bit, which simultaneously has candidates of the first and second values, among the bits; and calculating a log-likelihood ratio of the bit detected using the maximum likelihood metric of the candidate of the first value of the detected bit and the maximum likelihood metric of the candidate of the second value of the detected bit.

8. A method of detecting a transmission signal of a receiver, the method comprising:

estimating a channel matrix;

rearranging a plurality of layers on the basis of the norms of columns of an inverse matrix of the channel matrix;

detecting a transmission symbol candidate vector group by using the plurality of rearranged layers;

calculating a log-likelihood ratio of a transmission signal by using the maximum likelihood metric and a threshold value of each transmission symbol candidate vector included in the transmission symbol candidate vector group; and detecting the transmission signal on the basis of the log-likelihood ratio.

9. The method of claim 8, wherein the rearranging of the layers comprises:

arranging a layer, which has the lowest reliability and corresponds to a column having the largest norm among the norms of the columns of the inverse matrix, at the last column of the transmission signal; and arranging the rest of the layers at the rest of the columns from the first column except for the last column in an order corresponding to the norms of the columns of the inverse matrix.

10. The method of claim 8, wherein the calculating of the log-likelihood ratio comprises:

calculating the threshold value by using the transmission symbol candidate vector group;

calculating the maximum likelihood metric of each transmission symbol candidate vector; and updating the maximum likelihood metric of each transmission symbol candidate vector by using the threshold value.

11. The method of claim 10, wherein the calculating of the threshold value comprises:

calculating a first minimum Euclidean distance of candidates, which is a first value among the transmission symbol candidate vectors of the transmission symbol candidate vector group corresponding to bits of the transmission signal;

calculating a second minimum Euclidean distance of candidates, which is a second value that is different the first value among the transmission symbol candidate vectors corresponding to the bits;

calculating the maximum value of the first minimum Euclidean distance and the second Euclidean distance of the bits; and setting an average of the maximum values, which correspond to the bits, to the threshold value.

12. The method of claim 10, wherein the updating of the maximum likelihood metric includes substituting the maximum likelihood metric, which is larger than the threshold value, among the maximum likelihood metrics of the transmission symbol candidate vectors with the threshold value.

* * * * *